(12) United States Patent
Strahm, Jr.

(10) Patent No.: US 11,424,602 B2
(45) Date of Patent: Aug. 23, 2022

(54) VEHICLE WIRE HARNESS HOLDER

(71) Applicant: Honda Motor Co., Ltd., Tokyo (JP)

(72) Inventor: Jack A. Strahm, Jr., Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 466 days.

(21) Appl. No.: 16/683,705

(22) Filed: Nov. 14, 2019

(65) Prior Publication Data

US 2021/0151965 A1    May 20, 2021

(51) Int. Cl.
*H02G 1/08* (2006.01)
*H02G 3/04* (2006.01)
*B60R 16/02* (2006.01)

(52) U.S. Cl.
CPC ......... *H02G 3/045* (2013.01); *B60R 16/0215* (2013.01); *H02G 1/08* (2013.01); *H02G 3/0418* (2013.01)

(58) Field of Classification Search
CPC ........ H02G 3/045; H02G 1/08; H02G 3/0418; B60R 16/0215
USPC ......................................................... 29/825
See application file for complete search history.

(56) References Cited

U.S. PATENT DOCUMENTS

| | | | |
|---|---|---|---|
| 7,075,011 | B1 | 7/2006 | Kogure et al. |
| 7,561,445 | B2 | 7/2009 | Kajima et al. |
| 8,525,029 | B2 | 9/2013 | Kato et al. |
| 9,396,840 | B2 * | 7/2016 | Mizutani ............. H01B 9/02 |
| 10,124,748 | B2 | 11/2018 | Shimizu et al. |
| 2005/0045368 | A1 | 3/2005 | Keogh |
| 2009/0120661 | A1 | 5/2009 | Inoue et al. |
| 2011/0067920 | A1 | 3/2011 | Toyama et al. |
| 2013/0241282 | A1 | 9/2013 | Ikeno et al. |
| 2015/0246647 | A1 * | 9/2015 | Sugino ............... B60R 16/0215 174/102 R |
| 2018/0174709 | A1 | 6/2018 | Hagi et al. |
| 2018/0319355 | A1 | 11/2018 | Susaki et al. |

FOREIGN PATENT DOCUMENTS

| | | |
|---|---|---|
| CN | 106410707 | 2/2017 |
| CN | 206148879 | 5/2017 |
| JP | 4397879 | 1/2010 |
| WO | 2014198801 | 12/2014 |
| WO | 2018043542 | 3/2018 |
| WO | 2018147441 | 8/2018 |

* cited by examiner

*Primary Examiner* — Timothy J Thompson
*Assistant Examiner* — Michael F McAllister
(74) *Attorney, Agent, or Firm* — Rankin, Hill & Clark LLP

(57) ABSTRACT

A wire harness holder for mounting to an associated vehicle engine includes a housing having a lower housing part and an upper housing part hingedly connected to the lower housing part. In a closed position of the upper housing part relative to the lower housing part the housing defines a first interstitial space for routing of associated fused wires. A protection member is releasably mounted to the lower housing part. The protection member together with the lower housing part define a separate second interstitial space within the first interstitial space for routing of an associated +B cable. To mount the protection member to the lower housing part one of the lower housing part and the protection member includes a projection and the other of the lower housing part and the protection member includes a groove for receiving the projection.

20 Claims, 6 Drawing Sheets

VEHICLE WIRE HARNESS HOLDER

BACKGROUND

An engine wiring harness typically includes a wire harness routing control structures (e.g., a wire harness holder) mounted to an engine to control routing of fused wire(s), which cut current when an associated fused is short-circuited, and +B cable(s), which continuously pass current generated by an alternator or supplied by a battery. The wire harness holder is commonly made from materials such as polypropylene or nylon, which permits molding of flexible living hinges and clipping features. However, during a vehicle crash event (e.g., a front crash event), surrounding debris may impact the wire harness holder, which may cause damage to the +B cable(s). And although it is known to provide various impact resistant materials (e.g., a glass-filled nylon) on generating/supplying components (e.g., an alternator terminal bushing); these impact resistant materials are not suitable for molding flexible features such as living hinges and clips which are present in the typical wire harness holder.

BRIEF DESCRIPTION

According to one aspect, a wire harness holder for mounting to an associated vehicle engine comprises a housing having a lower housing part and an upper housing part hingedly connected to the lower housing part. In a closed position of the upper housing part relative to the lower housing part the housing defines a first interstitial space for routing of associated fused wires. A protection member is releasably mounted to the lower housing part. The protection member together with the lower housing part define a separate second interstitial space within the first interstitial space for routing of an associated +B cable. To mount the protection member to the lower housing part one of the lower housing part and the protection member includes a projection and the other of the lower housing part and the protection member includes a groove for receiving the projection.

According to another aspect, a wire harness holder for mounting to an associated vehicle engine comprising a housing having a lower housing part and an upper housing part hingedly connected to the lower housing part. In a closed position of the upper housing part relative to the lower housing part the housing defines a first interstitial space for routing of associated fused wires. An arch-shaped protection member includes a connector to releasably mount the protection member to the lower housing part. An elongated channel defined by the protection member faces a bottom wall of the lower housing part such that the protection member together with the lower housing part define a separate second interstitial space within the first interstitial space for routing of an associated +B cable. The protection member is formed of an impact resistant material to protect the associated +B cable in a vehicle crash event.

According to another aspect, an assembly method for a wire harness holder to be mounted to an associated vehicle engine is provided. The wire harness holder has routed therethrough associated fused wires and an associated +B cable. The method comprises providing a housing having a lower housing part and an upper housing part, and hingedly connecting the upper housing part to the lower housing part; providing an arch-shaped protection member for the associated +B cable, including positioning the associated +B cable within an elongated channel defined by the protection member and then wrapping an adhesive sleeve over the protection member to secure the associated +B cable within the channel; releasably connecting the protection member with the associated +B cable secured therein to the lower housing part; placing the associated fused wires along an upper surface of the protection member; and moving the upper housing part to a closed position covering the lower housing part with the protection member releasably connected to the lower housing part.

DETAILED DESCRIPTION

Figure 1:
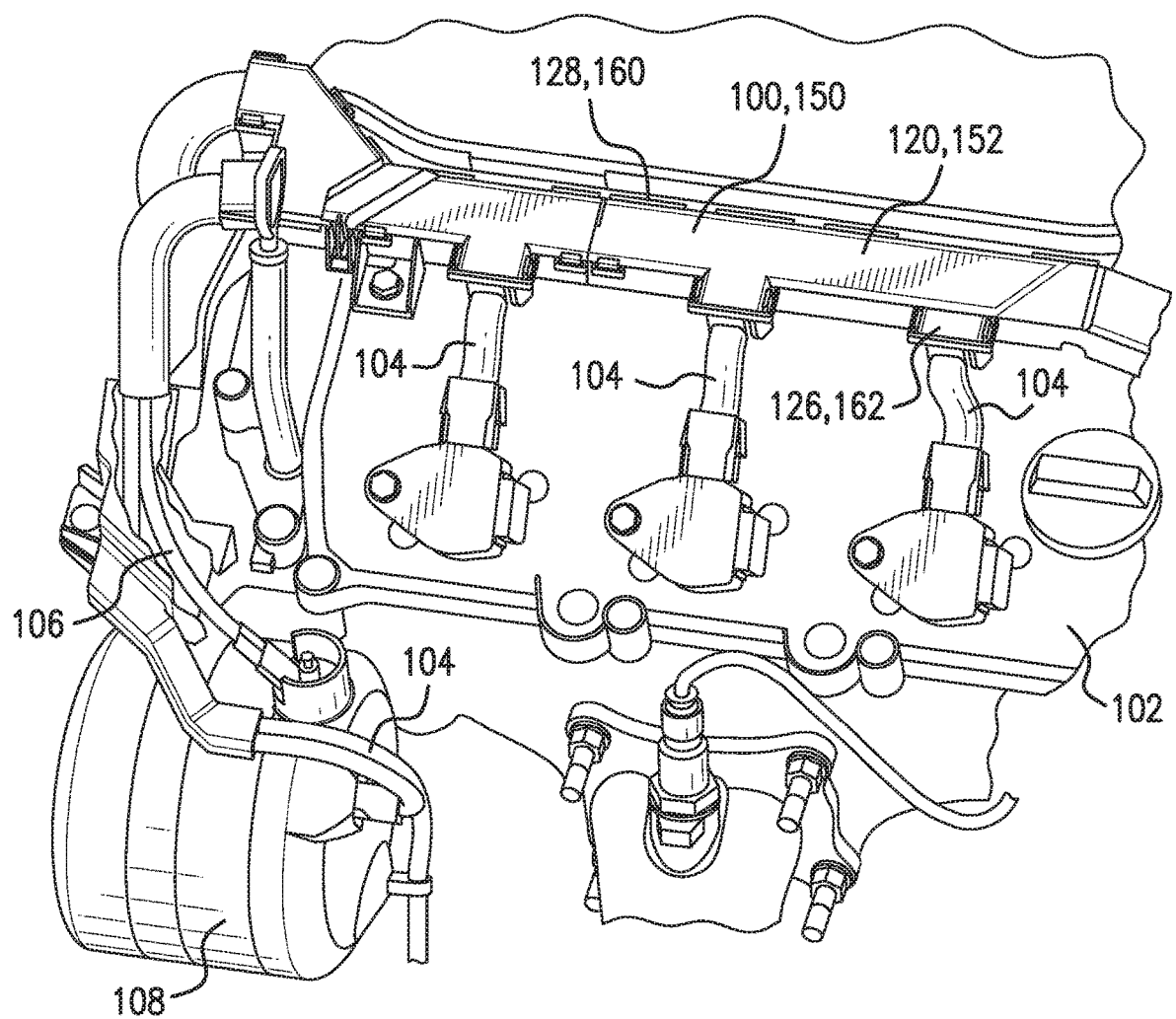
FIG. 1 is a perspective view of one of a known wire harness holder and an exemplary wire harness holder mounted to a vehicle engine.
Figure 2:
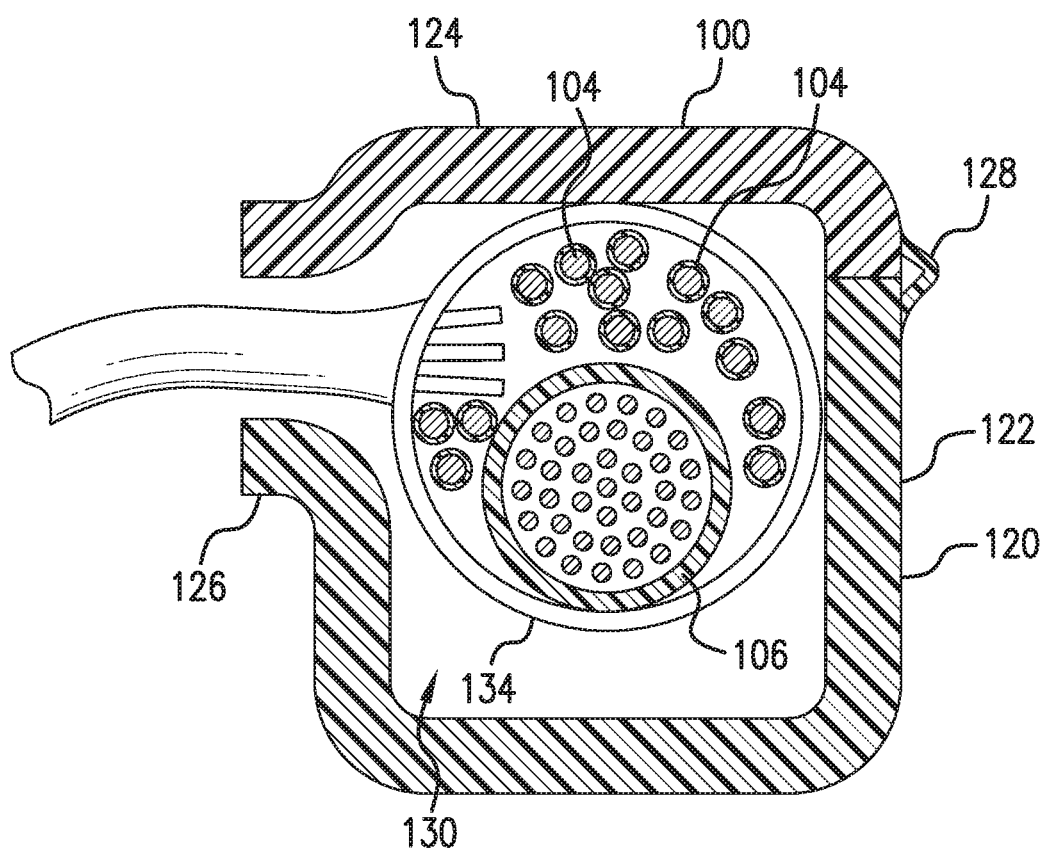
FIG. 2 is a cross-sectional view of the known wire harness holder.

It should, of course, be understood that the description and drawings herein are merely illustrative and that various modifications and changes can be made in the structures disclosed without departing from the present disclosure. For purposes of description herein, spatially relative terms relate to the invention as oriented in the figures. Referring now to the drawings, wherein like numerals refer to like parts throughout the several views, FIGS. 1 and 2 illustrates a known wiring harness holder 100 mounted to a vehicle engine 102. The harness holder 100 is adapted to control routing of fused wires 104 and +B cable(s) 106, which continuously pass current generated by, for example, an alternator 108. The harness holder 100 includes a housing 120 having a lower housing part 122 and an upper housing part 124, and branches 126 formed on the housing define exit positions along a length dimension of the harness holder 100 for the fused wires 104. The housing 120 is commonly made from materials such as polypropylene or nylon, which permits molding of flexible living hinges 128 which hingedly connected the upper housing part 124 to the lower housing part 122. This also allows the housing 120 to be molded as a single part for reduced costs. In a closed position of the upper housing part relative to the lower housing part the housing 120 defines an interstitial space 130 for routing of a taped bundle 134 containing the fused wires 104 and the +B cable(s) 106. As indicated above, during a vehicle crash event, surrounding debris may impact the housing 120, and, in turn, the taped bundle 134 routed therethrough, which may cause damage to the +B cable(s).

With reference to FIGS. 1 and 3-6, an exemplary wire harness holder 150 according to the present disclosure is mounted to the vehicle engine 102 and is configured to protect the +B cable(s) 106 during a vehicle crash event. Similar in configuration to the harness holder 100, the harness holder 150 comprises a housing 152 having a lower housing part 156, an upper housing part 158 hingedly connected to the lower housing part via flexible living hinges 160, and branches 162 formed on the housing for exiting of the fused wires 104. In a closed position of the upper housing part 158 relative to the lower housing part 156, the housing 152 defines a first interstitial space 166 for routing of the fused wires 104, which can be bundled in tape 168. A separate protection member 180 is releasably mounted to the lower housing part 156. The protection member 180 together with the lower housing part 156 define a separate second interstitial space 184 within the first interstitial space 166 for separately routing of the +B cable (s) 106 within the housing 152 of the harness holder 150. Similar to the known housing 120, the housing 152 is made from materials such as polypropylene or nylon which allow for the molding of the flexible living hinges 160. However, in contrast to the tape 134, the protection member 180 is formed of a glass-filled nylon or similar material that is impact resistant to protect the +B cable(s) 106 from possible damage during a vehicle crash event.

Figure 3:
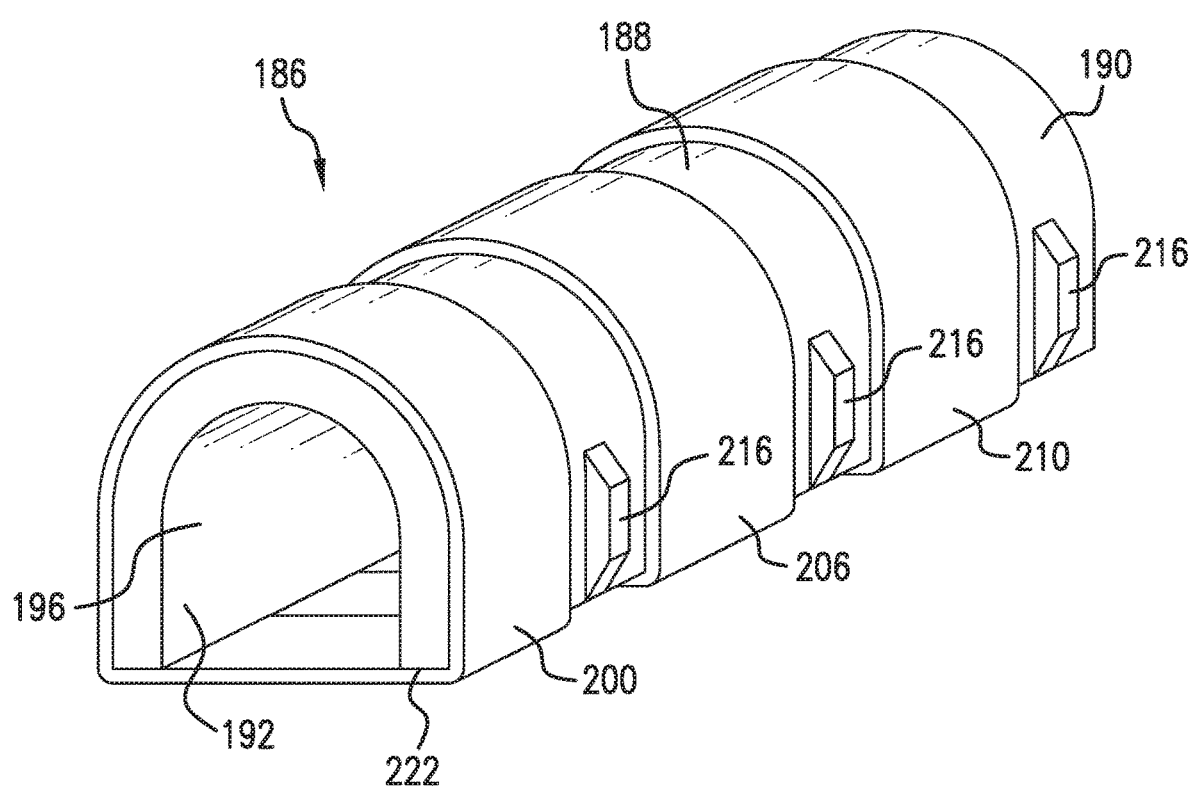
FIG. 3 a perspective view of a protection member of the exemplary wire harness holder.
Figure 4:
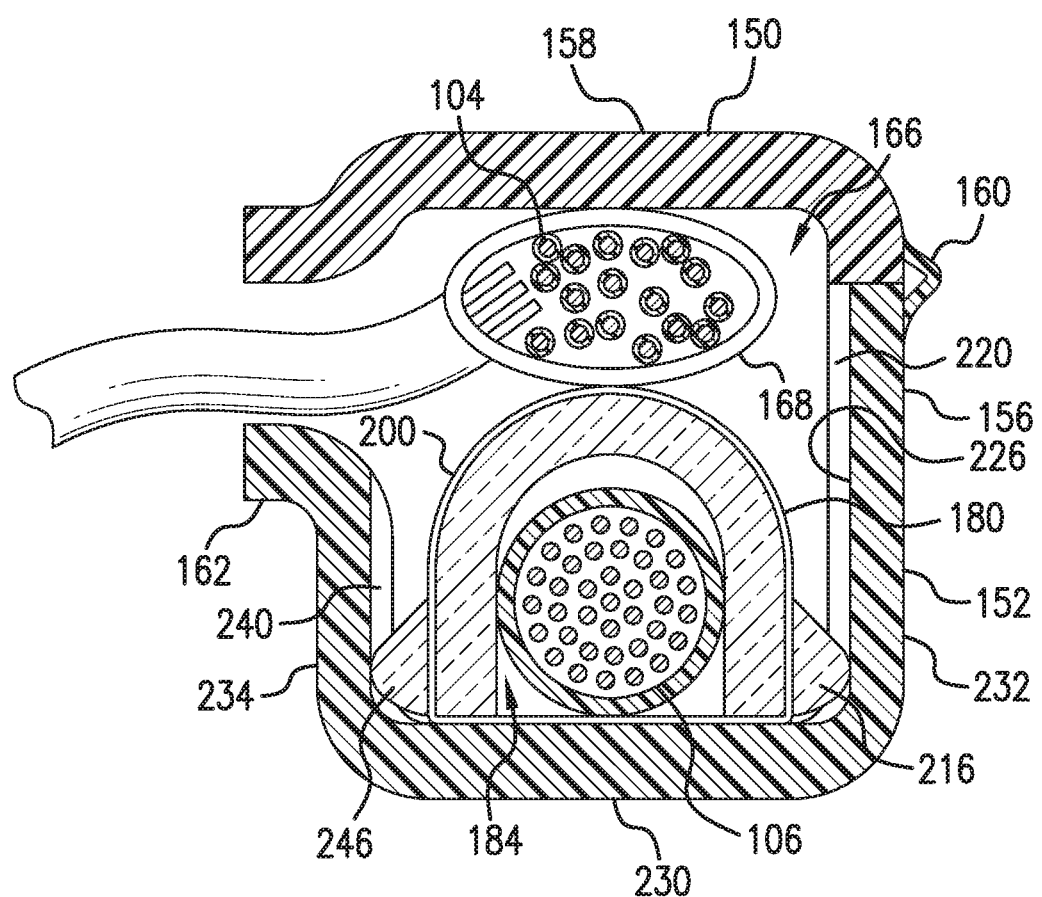
FIGS. 4, 5 and 6 are cross-sectional views of the exemplary wire harness holder.
Figure 5:
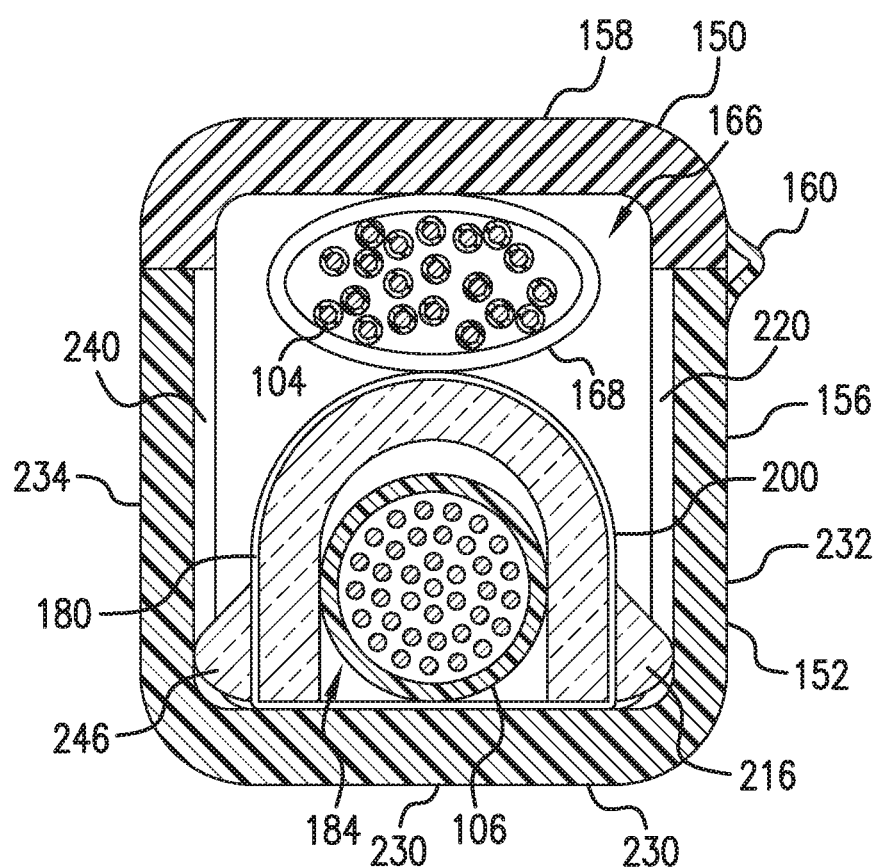
Figure 6:
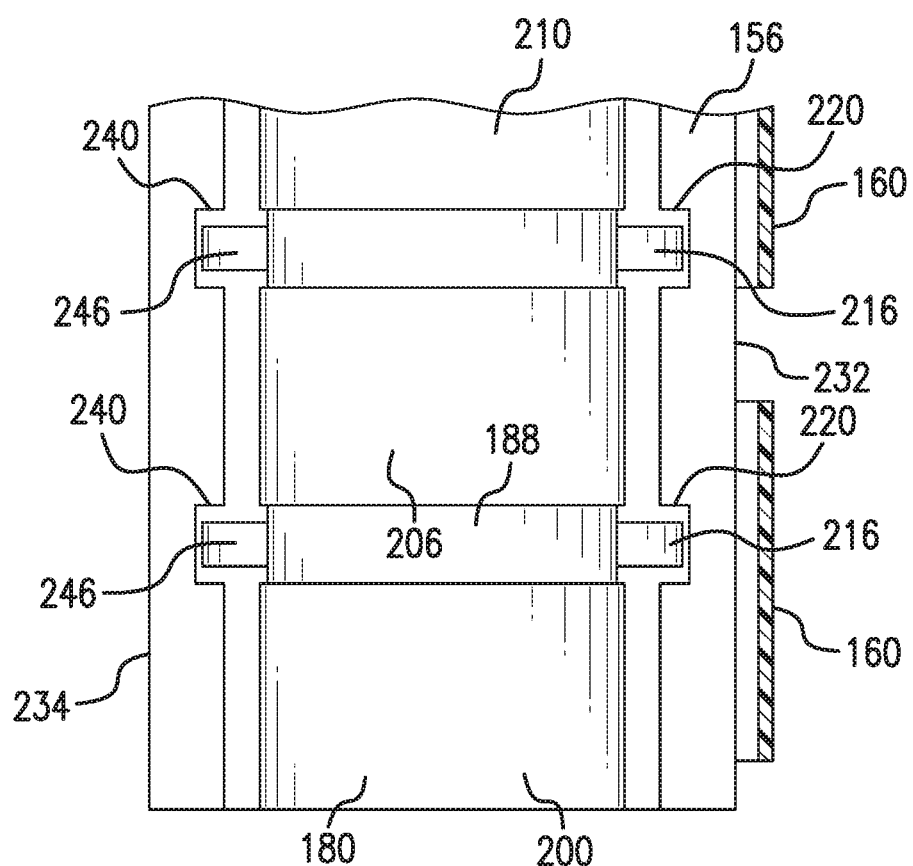

The exemplary protection member 180 is best depicted in FIG. 3. As shown, the protection member includes a body 188 elongated in a length dimension of the harness holder 150. The body 188 includes an outer surface 190 and an inner surface 192 which is shaped to define an elongated channel 196. The channel 196 is sized to receive the +B cable(s) 106. In the depicted aspect, the body 188 is formed in an arch configuration so that the outer surface 190 is devoid of corners that may cause damage to the taped bundle 168 having the fused wires 104 which is routed along the protection member 180. As shown, at least one adhesive sleeve 200 can be adhered to the outer surface 190 of the body 188 of the protection member 180. Because the at least one adhesive sleeve 200 is wrapped around an outer periphery of the protection member 180, a portion of the at least one adhesive sleeve at least partially covers the channel 196. Therefore, by use of the at least one adhesive sleeve 200, the +B cable(s) can be secured within the protection member 180 allowing the protection member together with the +B cable(s) to be mounted within the housing 152 as a combined unit. It should be appreciated that the at least one adhesive sleeve 200 can also secure the taped bundle 168 having the fused wires 104 between the upper housing part 158 in the closed position and an upper surface of the protection member 180, which substantially vertically aligns the fused wires 104 with the branches 162 of the housing 152. According to the present embodiment, the at least one adhesive sleeve 200 is a first adhesive sleeve, and the protection member 180 can include a second adhesive sleeve 206 spaced in a length dimension of the protection member from the first adhesive sleeve 200 and wrapped around the outer periphery of the protection member. Further, depending on a length dimension of the protection member required for the harness holder 150, the protection member 180 can include an additional third adhesive sleeve 210 spaced in the length dimension from the second adhesive sleeve 206 and wrapped around the outer periphery of the protection member.

To mount the protection member 180 within the housing 152, one of the lower housing part 156 and the protection member 180 includes a first connector (for example, the depicted projection 216) and the other of the lower housing part 156 and the protection member 180 includes a corresponding second connector (for example, the depicted groove 220 for receiving the projection 216). Further, if the protection member 180 includes the second adhesive sleeve 206, the projection or the groove provided on the protection member 180 is located between the first adhesive sleeve 200 and the second adhesive sleeve 206. According to the embodiment shown in FIGS. 3-6, the projection 216 is provided on the outer surface 190 of the body 188 adjacent to a bottom 222 of the protection member having the channel 196, and the groove 220 is formed on an inner surface 226 of the lower housing part 156. Again, depending on the length dimension of the protection member 180 required for the harness holder 150, a plurality of projections 216 can be provided on the outer surface 190 of the body 188, and a plurality or corresponding grooves 220 can be formed on the inner surface 226 of the lower housing part 156. More particularly, the lower housing part includes a bottom wall 230 and opposed first and second sidewalls 232, 234, the second sidewall having the branches 162. The plurality of grooves 220 can be formed on the first sidewall 232 and can extend an entire height dimension of the first sidewall for ease of receipt of the plurality of projections 216. To further secure the protection member 180 within the housing 152, a plurality of second grooves 240 can be formed on the second sidewall 234, and a plurality of second projections 246 can be provided on the outer surface 190 of the body 188 to be received in the plurality of second grooves 240. In the depicted aspect, each of the projections 216, 246 and each of the grooves 220, 240 is oriented substantially perpendicular to a longitudinal direction of the wire harness holder 150. Therefore, when assembled, the channel 196 faces the bottom wall 230 of the lower housing part 156 such that the protection member 180 together with the lower housing part 156 define the separate second interstitial space 184 for routing of the +B cable(s) 106. In addition, because each adhesive sleeve 200, 206, 210 is spaced from each of the first and second sidewalls 232, 234, the protection member 180 together with the +B cable(s) 106 can be easily removed from the housing 152.

As is evident from the foregoing, an assembly method for the wire harness holder 150 to be mounted to the vehicle engine 102 is provided. The wire harness holder 150 has routed therethrough the fused wires 104 and the +B cable(s) 106. The exemplary method comprises providing the housing 152 having the lower housing part 156 and the upper housing part 158, and hingedly connecting the upper housing part 158 to the lower housing part 156; providing the arch-shaped protection member 180 for the +B cable(s) 106, including positioning the +B cable(s) within the elongated channel 196 defined by the protection member 180 and then wrapping the at least one adhesive sleeve 200 over the protection member to secure the +B cable(s) within the channel; releasably connecting the protection member 180 with the +B cable(s) 106 secured therein to the lower housing part 156; placing the fused wires 104 along an upper surface of the protection member 180; and moving the upper housing part 158 to a closed position covering the lower housing part 156 with the protection member 180 releasably connected to the lower housing part. The connecting step can include providing the projection 216 on one of the lower housing part 156 and the protection member 180 and providing the groove 220 for receiving the projection on the other of the lower housing part and the protection member. The method further includes forming the protection member 180 of an impact resistant material (e.g., a glass-filled nylon material) to protect the +B cable(s) 106 in a vehicle crash event.

It will be appreciated that variations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A wire harness holder for mounting to an associated vehicle engine comprising:

a housing having a lower housing part and an upper housing part hingedly connected to the lower housing part, in a closed position of the upper housing part relative to the lower housing part the housing defines a first interstitial space for routing of associated fused wires; and a protection member releasably mounted to the lower housing part, the protection member together with the lower housing part define a separate second interstitial space within the first interstitial space for routing of an associated +B cable, wherein to mount the protection member to the lower housing part one of the lower housing part and the protection member includes a projection and the other of the lower housing part and the protection member includes a groove for receiving the projection.

2. The wire harness holder of claim 1, wherein a bottom of the protection member includes a channel elongated along a length dimension of the protection member, the channel facing a bottom wall of the lower housing part.

3. The wire harness holder of claim 2, further including an adhesive sleeve wrapped around an outer periphery of the protection member, the adhesive sleeve at least partially covering the channel and adapted to secure the associated +B cable within the protection member.

4. The wire harness holder of claim 3, further including a second adhesive sleeve spaced in the length dimension from the adhesive sleeve and wrapped around the outer periphery of the protection member.

5. The wire harness holder of claim 4, wherein the projection or the groove provided on the protection member is located between the adhesive sleeve and the second adhesive sleeve.

6. The wire harness holder of claim 2, wherein the protection member is formed in an arch configuration.

7. The wire harness holder of claim 1, wherein the projection is provided on an outer surface of the protection member, and the groove is formed on an inner surface of the lower housing part.

8. The wire harness holder of claim 7, wherein a plurality of projections is provided on the outer surface of the protection member, and a plurality or corresponding grooves are formed on the inner surface of the lower housing part.

9. The wire harness holder of claim 8, wherein the lower housing part includes a bottom wall and opposed first and second sidewalls, the plurality of grooves formed on the first sidewall, and further including a plurality of second grooves formed on the second sidewall, the plurality of projections received in the plurality of grooves, and further including a plurality of second projections provided on the outer surface of the protection member and received in the plurality of second grooves.

10. The wire harness holder of claim 8, wherein each of the projections and each of the grooves is oriented substantially perpendicular to a longitudinal direction of the wire harness holder.

11. The wire harness holder of claim 1, wherein the protection member is formed of a glass-filled nylon.

12. A wire harness holder for mounting to an associated vehicle engine comprising:

a housing having a lower housing part and an upper housing part hingedly connected to the lower housing part, in a closed position of the upper housing part relative to the lower housing part the housing defines a first interstitial space for routing of associated fused wires; and an arch-shaped protection member including a connector to releasably mount the protection member to the lower housing part, an elongated channel defined by the protection member facing a bottom wall of the lower housing part such that the protection member together with the lower housing part define a separate second interstitial space within the first interstitial space for routing of an associated +B cable, wherein the protection member is formed of an impact resistant material to protect the associated +B cable in a vehicle crash event.

13. The wire harness holder of claim 12, wherein the connector is a projection provided on an outer surface of the protection member, and a sidewall of the lower housing part has a groove formed therein for receiving the projection.

14. The wire harness holder of claim 12, further including an adhesive sleeve wrapped around an outer periphery of the protection member, the adhesive sleeve at least partially covering the channel and adapted to secure the associated +B cable within the protection member.

15. The wire harness holder of claim 14, the lower housing part includes opposed first and second sidewalls, and the adhesive sleeve is spaced from each of the first and second sidewalls allowing the protection member to be removed from the housing.

16. The wire harness holder of claim 14, further including a second adhesive sleeve spaced in a length dimension of the protection member from the adhesive sleeve and wrapped around the outer periphery of the protection member, and the connector provided on the protection member is located between the adhesive sleeve and the second adhesive sleeve.

17. The wire harness holder of claim 12, wherein the protection member is formed of a glass-filled nylon.

18. An assembly method for a wire harness holder to be mounted to an associated vehicle engine, the wire harness holder having routed therethrough associated fused wires and an associated +B cable, the method comprising:

providing a housing having a lower housing part and an upper housing part, and hingedly connecting the upper housing part to the lower housing part;

providing an arch-shaped protection member for the associated +B cable, including positioning the associated +B cable within an elongated channel defined by the protection member and then wrapping an adhesive sleeve over the protection member to secure the associated +B cable within the channel;

releasably connecting the protection member with the associated +B cable secured therein to the lower housing part;

placing the associated fused wires along an upper surface of the protection member; and moving the upper housing part to a closed position covering the lower housing part with the protection member releasably connected to the lower housing part.

19. The method of claim 18, wherein the connecting step includes providing a projection on one of the lower housing part and the protection member and providing a groove for receiving the projection on the other of the lower housing part and the protection member.

20. The method of claim 18, including forming the protection member of an impact resistant material to protect the associated +B cable in a vehicle crash event.

* * * * *